United States Patent [19]

Prukop et al.

[11] Patent Number: 4,976,315

[45] Date of Patent: Dec. 11, 1990

[54] USE OF TAURINE ADDITIVES IN ENHANCED OIL RECOVERY WITH ANIONIC SURFACTANTS

[75] Inventors: Gabriel Prukop; Chhiv K. Chea, both of Houston, Tex.

[73] Assignee: Texaco Inc., White Plains, N.Y.

[21] Appl. No.: 432,029

[22] Filed: Nov. 6, 1989

[51] Int. Cl.$^5$ .............................................. E21B 43/22
[52] U.S. Cl. .................................... 166/270; 166/252; 166/275; 166/300; 252/8.554
[58] Field of Search ......................... 166/252, 275, 300

[56] References Cited

U.S. PATENT DOCUMENTS

| | | | |
|---|---|---|---|
| Re.29,219 | 5/1977 | Flournoy et al. | 166/252 |
| 3,858,656 | 1/1975 | Flournoy et al. | 166/274 |
| 3,939,911 | 2/1976 | Maddox, Jr. et al. | 166/274 |
| 4,008,768 | 2/1977 | Birk | 166/274 |
| 4,076,743 | 2/1978 | Koch et al. | 260/501.13 |
| 4,166,038 | 8/1979 | Stournas | 252/8.55 D |
| 4,193,452 | 3/1980 | Wilson et al. | 166/274 |
| 4,216,097 | 8/1980 | Stournas | 252/8.55 D |
| 4,222,881 | 9/1980 | Byham et al. | 252/8.55 D |
| 4,438,045 | 3/1984 | Nieh et al. | 260/501.13 |
| 4,482,634 | 11/1984 | Davis et al. | 436/31 |
| 4,490,676 | 12/1984 | Davis et al. | 324/376 |
| 4,502,540 | 3/1985 | Byham | 166/274 |
| 4,554,974 | 11/1985 | Kalpakci et al. | 166/273 |
| 4,585,065 | 4/1986 | Penny et al. | 166/308 |
| 4,825,950 | 5/1989 | Kalpakci et al. | 166/273 |

FOREIGN PATENT DOCUMENTS 2001377  1/1979  United Kingdom .

OTHER PUBLICATIONS

R. N. Healy, et al., "Physicochemical Aspects of Microemulsion Flooding," Society of Petroleum Engineers Journal, pp.491-501 (Oct. 1974).
J. L. Cayias, et al., "The Measurement of Low Interfacial Tension via the Spinning Drop Technique," Adsorption at Interfaces, ACS Symposium Series No. 8, pp. 234-247 (1975).
J. L. Salager, et al., "Optimum Formulation of Surfactant/Water/Oil Systems for Minimum Interfacial Tension or Phase Behavior," pp. 107-115 (Apr. 1979).
B. R. Bluestein, et al., Amphoteric Surfactants, Marcel Dekker, Inc. New York (1982).
J. W. Ware, "Salem Unit Micellar/Polymer Project," SPE 11985, 58th Annual SPE Technical Conference & Exhibition, pp. 1-19 (Oct. 5-8, 1983).
S. S. Ashrawi, "A Study of the Relationship Between Surfactant/Oil/Brine System Phase Behavior and Chemical Flood Recovery in Short Cores," SPE/DOE Fourth Symposium on Enhanced Oil Recovery, pp. 311-320 (Apr. 15-18, 1984).

Primary Examiner—Ramon S. Britts
Assistant Examiner—Roger J. Schoeppei
Attorney, Agent, or Firm—Jack H. Park; Kenneth R. Priem; Harold J. Delhommer

[57] ABSTRACT

A method is disclosed for increasing the recovery of oil in enhanced oil recovery operations employing anionic surfactant by blending a taurine with said anionic surfactant. The taurine may also increase the salt and divalent ion tolerance of the anionic surfactant.

11 Claims, No Drawings 4,976,315

USE OF TAURINE ADDITIVES IN ENHANCED OIL RECOVERY WITH ANIONIC SURFACTANTS

BACKGROUND OF THE INVENTION

This invention relates to a method for recovering oil from a subterranean oil-bearing formation. The method employs surfactants and additions to such surfactants.

The petroleum industry has recognized for many years that the natural formation energy of a petroleum reservoir will produce only a portion of the crude oil originally in the reservoir. Waterflooding has been commonly used to enhance the recovery. In waterflooding, water, or other aqueous fluid, is introduced through injection wells to drive oil through the reservoir to offset producing wells. Such flooding, however, is inefficient, leaving behind in the reservoir more than half of the original reservoir crude oil. The reason for this is that much of the oil that is retained after a typical waterflood is in the form of discontinuous globules or discrete droplets which are trapped within the pore spaces of the reservoir. The normal interfacial tension between the reservoir oil and water used for flooding is so high that these discrete droplets are unable to deform sufficiently to pass through narrow constrictions in the pore channels of the formation.

Surface-active agents or surfactants have been found to reduce or lower the interfacial tension between the water and reservoir oil so that the oil droplets may deform, coalesce and flow with the flood water toward producing wells.

A number of various types of surfactants have been suggested for use--anionic surfactants, cationic surfactants, and nonionic surfactants. Anionic surfactants have generally been preferred.

However, a problem with using any surfactant in waterflooding processes for the recovery of oil is that the efficiency of the oil displacement is strongly affected by the surfactant's surface activity, or the extent of the surfactant's lowering of the oil-water interfacial tension. Many surfactants are unable to exhibit high surface activity at temperatures as high as or higher than about 120 degrees Fahrenheit and/or in aqueous solutions containing concentrations of inorganic salts as high as or higher than 2 percent sodium chloride (NaCl) and over 0.2 percent calcium chloride ($CaCl_2$) and magnesium chloride ($MgCl_2$). Many oilfield reservoirs have such high temperatures and inorganic salt concentrations. In fact, it would not be unusual for reservoir brine to have concentrations of over 6 or even 8 percent NaCl and over 0.6 or even 0.8 percent $CaCl_2$ and $MgCl_2$. For example, West Texas (Permian Basin) and Gulf Coast reservoirs typically have about 100,000 parts per million total dissolved solids comprised of about 10 percent NaCl and about 0.1 percent other salts such as $CaCl_2$ and $MgCl_2$. (All percentages reported herein are percents by weight unless otherwise noted). Other problems with surfactant flooding processes include poor phase behavior of the flooding medium upon flow through a formation and a generally lower ability to displace oil as the temperature of the formation increases.

Surfactants that can retain high surface activity in reservoir conditions have been sought and a number have been suggested. Such surfactants have included blends of surfactants or surfactant combinations. One example is disclosed in U.S. Pat. No. 3,939,911, issued Feb. 24, 1976 to Maddox, Jr., claiming a three surfactant system. The three surfactant system includes an anionic surfactant, a phosphate ester surfactant, and a particular sulfonated betaine which is an amphoteric surfactant.

Others have disclosed the use of certain amphoteric surfactants in surfactant flooding processes. For example, U.S. Pat. No. 4,076,743 issued Feb. 28, 1978 to Koch et al, U.S. Pat. No. 4,216,097 issued Aug. 5, 1980 to Stournas, U.S. Pat. No. 4,438,045 issued Mar. 20, 1984 to Nieh, and U.S. Pat. No. 4,502,540 issued Mar. 5, 1985 to Byham, all disclose the use of certain amphoteric surfactants in surfactant flooding processes. Some of the patents report the ability of the surfactants to maintain surface activity in the presence of relatively high amounts of divalent ions or the compatibility of the surfactants with such ions.

However, there continues to be a need for additional and improved surfactants having utility in enhanced oil recovery operations and for more efficient methods of recovering oil from subterranean formations.

SUMMARY OF THE INVENTION

A method is disclosed for increasing the recovery of oil or petroleum in enhanced oil recovery operations employing anionic surfactant by adding or blending a taurine with said anionic surfactant. Such operations include, but are not limited to, surfactant floods of the oil bearing formation in which an aqueous fluid comprising an anionic surfactant is injected into the formation via at least one injection well penetrating the formation and is driven by a drive fluid through the formation towards at least one production well penetrating the formation, and oil displaced by the fluid is produced via the production well or wells.

Preferably, the taurine component will be added to the anionic surfactant, or blended with the anionic surfactant, in an amount less than the amount of anionic surfactant but in an amount sufficient to lower the interfacial tension between the oil and brine with the surfactant. Adding a taurine to an anionic surfactant also provides a method of increasing the salt and divalent ion tolerance of the anionic surfactant, thereby expanding the scope of the anionic surfactant's utility for enhanced oil recovery operations In an alternative embodiment of this invention, amphoteric compounds similar to taurine, but whose formulas have a carboxylate group or a sulfate group substituted for the sulfonate group on the taurine molecule, may be substituted for a taurine.

DETAILED DESCRIPTION OF THE PREFERRED EMBODIMENT

The present invention concerns the addition of a taurine to an anionic surfactant, or the blending of a taurine with an anionic surfactant, to enhance the oil recovery obtainable in enhanced oil recovery operations with the anionic surfactant, and to increase the tolerance of the anionic surfactant to brine and divalent ions.

The advantages of this invention may be realized with any anionic surfactant or anionic surfactant system suitable for use in enhanced oil recovery operations. As used herein, the term "anionic surfactant system" shall be understood to comprise one or more anionic surfactants blended with one or more other surfactants, and optionally an alcohol and/or an oil. Such "other surfactants" may be anionic, non-ionic, cationic or amphoteric. The surfactant system may comprise an aqueous fluid or a microemulsion. A microemulsion is a stable (at equilibrium), translucent micellar solution of oil, water that may contain electrolytes, and one or more amphiphilic compounds such as surfactants. At the point where the amount of water dissolved in the surfactant is equal to the amount of oil dissolved in the surfactant, there is the lowest surface tension between both the microemulsion and the oil and between the microemulsion and the water. Microemulsions form in situ in the reservoir, whether or not the surfactant is injected in an aqueous fluid rather than in a microemulsion. One of many examples of a surfactant system is disclosed in U.S. Pat. No. 3,939,911 issued to Maddox et al.

Preferably, any surfactant system employed in this invention will be dominated by one or more anionic surfactants. That is, there will be more, by weight, of one or more anionic surfactants than any other component of the system.

Examples of anionic surfactants suitable for use in this invention are hydrocarbon sulfonates and sulfates, particularly petroleum sulfonates and synthetic surfactants, such as synthesized alkyl aryl sulfonates, alpha olefin sulfonates, ethoxysulfates, ethoxysulfonates, and carboxylates, selected for their ability to reduce the interfacial tension between crude oil and brine.

The anionic surfactants should also preferably be relatively tolerant to the conditions of the underground formation or reservoir in which they will be used. That is, the anionic surfactants should retain their ability to reduce the interfacial tension between oil and brine and must not precipitate at the reservoir temperature and in the presence of divalent ions in concentrations found in the reservoir brine, at least after addition of the taurine component, and preferably before such addition. Addition of a taurine according to the method of this invention will reduce the interfacial tension and increase the salt and divalent ion tolerance of the anionic surfactant even further. Consequently, the method of this invention will expand the scope of the potential utility of the anionic surfactant (to which a taurine is added) for enhanced oil recovery operations. The method of this invention may also enable some anionic surfactants to be useful in enhanced oil recovery operations that previously could not be successfully used for such operations.

The taurines suitable for use in this invention have the following formula:

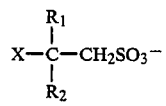

wherein $R_1$ is hydrogen, a phenyl group, or an alkyl group having about four or fewer carbon atoms, $R_2$ is hydrogen, a phenyl group, or an alkyl group having about four or fewer carbon atoms, and $R_2$ is alike or different from $R_1$, and X is $NH_2$ or $NH_3^+$.

Taurine, also called 2-aminoethanesulfonic acid, having the formula:

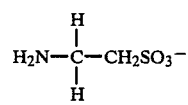

and $\beta_1\beta_1$ dimethyl taurine, having the formula:

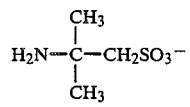

are preferred taurines for practicing this invention.

Methods for preparing taurines are described in the book, *Amphoteric Surfactants*, by Bluestein and Hilton, published by Marcel Dekker, Inc., New York (1982).

The taurines of this invention are amphoteric, and have the ability to form zwitter ions over a fairly broad pH range, a pH range from about 4 to about 8. Taurines of this invention are effective in the presence of calcium and magnesium divalent ions in a concentration of from about 200 to about 14,000 parts per million (ppm). They are also thermally stable in solution, up to temperatures of at least 225° F., neither becoming insoluble nor hydrolyzing This salt tolerance and temperature stability of the taurines of this invention allow considerable versatility in planning surfactant systems for practicing this invention.

In practicing the method of this invention, a taurine is added to an anionic surfactant or anionic surfactant system in an effective amount. For purposes of this invention, an effective amount of a taurine is an amount that will lower the interfacial tension between the oil and brine with the surfactant or surfactant system. That is, the interfacial tension between the oil and the brine with the surfactant or surfactant system will be lower when a taurine has been mixed with the surfactant or added to the surfactant system than when the surfactant is not mixed with taurine or the surfacant system does not include a taurine component, provided that an effective amount of the taurine has been added. Interfacial tension may readily be measured by methods known to those skilled in the art. Preferred methods or techniques for measuring interfacial tension are the sessile drop method and the spinning drop method. The sessile drop method or technique for measuring interfacial tension is discussed by Healy and Reed in "Physicochemical Aspects of Microemulsion Flooding," *Society of Petroleum Engineers Journal*, pp. 491–501 (October 1974). The spinning drop method or technique for measuring interfacial tension is discussed by Cayias et al. in "The Measurement of Low Interfacial Tension via the Spinning Drop Technique," *Adsorption at Interfaces*, American Chemical Society Symposium Series, pp. 234–47 (1975). Such effective amount of a taurine will preferably be less than or about 5% by weight of taurine with respect to the surfactant or surfactant system. The exact amount of a taurine to add to the surfactant or surfactant system must be determined with respect to the specific surfactant(or surfactant system)/brine/oil system in which the taurine will be employed.

Most preferably, the concentration of the taurine component will be below the molar concentration of anionic surfactant. Such concentration may be adjusted as needed to account for any absorption or adsorption of surfactant and taurine by the reservoir rock.

The enhanced oil recovery operations to which this invention is applicable are processes for recovering oil employing surfactants to increase the recovery of oil from subterranean oil-bearing formations or reservoirs. Such processes, generally known as surfactant flooding processes, employ surfactants to lower the oil-water interfacial tension and/or to alter the wettability characteristics of the reservoir rock. The processes may be like waterflooding processes, but employ dilute surfactant solution instead of water or brine alone, such as an aqueous surfactant solution containing surfactant in a concentration less than about 0.5 weight percent, in an amount necessary to carry out a complete flood of the formation, normally 1-2 pore volumes. Alternatively, the dilute surfactant solution may be injected into the formation in lesser amounts, with a drive fluid also injected into the formation. This alternative is actually a variation of the previous alternative when one views the drive fluid of the previous method as the surfactant solution itself. In both alternatives, a mobility control agent, such as a polymer thickener, may be added to the surfactant solution and/or drive fluid. In still another alternative, a concentrated surfactant solution, e.g., about 0.05-0.5 pore volume, may be injected as a surfactant slug, optionally followed by a mobility control fluid, and followed by a driving fluid in amounts necessary to complete a flood of the formation. A dilute surfactant solution will typically have a concentration within the range of about 0.01-0.5% by weight. A concentrated surfactant solution will typically have a concentration within the range of about 0.5-8% by weight. In these processes, the fluids are injected into the formation via one or more injection wells penetrating the formation and oil is produced from one or more production wells penetrating the formation. The production wells are offset from the injection wells.

In applying the method of this invention with such enhanced oil recovery processes, an effective amount of a taurine is added to the anionic surfactant or surfactant system selected for use in the process. Preferably, the taurine will be added to, or blended with, the surfactant (or surfactants) prior to injection of the surfactant into the formation. The taurine might alternatively be added to the surfactant by injecting both the surfactant and taurine into the formation at about the same time and place.

The mechanism by which taurines enhance oil recovery with anionic surfactants and increase the tolerance of the anionic surfactants to salts and divalent ions is not known. It is believed, without intending to limit this invention, that the positive end group of the taurine zwitter ion forms an ion-pair with the anionic end of the anionic surfactant molecule, thus making the hydrophilic end of the surfactant pair larger with a more diffused charge. This could have the beneficial effect of making the anionic surfactant molecule tend to stay at the oil/brine interface, where it is most effective in solubilizing the oil. This hypothesis, if correct, indicates that a small zwitter ion would be superior to a large zwitter ion. A small zwitter ion, like a taurine of this invention, would better be able to dissipate the charge with less influence on or change in the operation or anionic effect of the surfactant system overall. Hence taurines of this invention are superior for this purpose than larger amphoteric surfactants known in the art for use in enhanced oil recovery operations.

It is further believed that amphoteric compounds similar to the taurines of this invention, but whose formulas have a carboxylate group ($COO^-$), or a sulfate group ($OSO_3^-$) substituted for the sulfonate group ($SO_3^-$) on the taurine molecule, would yield effective additives as a substitute for a taurine for use according to the method of this invention. Those skilled in the art would be able to prepare such "taurine-like" molecules, applying the principles taught for preparing amphoteric surfactants in the book, *Amphoteric Surfactants* by Bluestein and Hilton, published by Marcel Dekker, Inc., New york (1982).

This invention is further illustrated by the experiments discussed below.

EXPERIMENTS

Surfactant Screening Tests

Surfactant screening tests were conducted to evaluate the solution properties of 2-aminoethanesulfonic acid, or taurine. Specifically, aqueous solutions of surfactant and taurine were prepared, as will be discussed in more detail below, without oil to assess the stability of the surfactant system with taurine added. Phase separation or precipitation of portions of a solution would indicate an unstable solution. Such tests are well understood by those skilled in the art.

In these screening tests, fixed concentrations of taurine, 0.25, 0.5 and 0.75% by weight, were added respectively to various combinations of three surfactants—TRS18, a petroleum sulfonate obtained from WITCO Chemical Co.; TRS40, a petroleum sulfonate obtained from WITCO Chemical Co.; and LN60COS, a linear ethoxysulfate obtained from TEXACO Chemical Co. For each surfactant combination, a surfactant solution was prepared without addition of taurine for comparison with the surfactant solution to which taurine was added. The various combinations are reported in Table 1 below. The total active concentration of surfactant in each solution was 5% by weight.

The solutions also contained 80% by weight synthetic Salem brine, or brine from the Salem field, or more precisely, the Benoist Reservoir in the Salem field in Illinois, containing 89700 $g/m^3$ total dissolved solids and 4170 $g/m^3$ divalent ions. Deionized water was added to make the total active surfactant concentration about 5% by weight. Surfactants are typically only 40-50% active. Hence, the exact amount of bulk surfactants and amount of deionized water added to each surfactant combination varied from sample to sample, but salinity and total active surfactant concentration were constant, i.e., the same, from sample to sample.

The solutions were allowed to stand or age for about 24 hours and were then examined for phase stability. Also, capillary displacement tests were conducted and interfacial tension (with oil) measurements were taken. The phase stability and capillary displacement results, when plotted on a terniary diagram as common practice in the art, indicated that the solutions with taurine yielded eleven stable or active points compared to eight stable or active points yielded by the solutions without taurine. The area of stability was shifted toward more water solubility, or toward the water-solubility corner of the terniary diagram, as expected, since taurine is water soluble.

Table 1 below compares the interfacial tensions of the brine and oil with the various surfactant solutions with and without taurine. For laboratory convenience, interfacial tensions of the surfactant solutions without taurine were measured by the sessile drop method and interfacial tensions of the surfactant solutions with taurine were measured by the spinning drop method.

TABLE 1

INTERFACIAL TENSIONS (IFT) FOR MIXTURES WITH AND WITHOUT 0.5% TAURINE

| Surfactant Formulation TRS18/TRS40/LN60COS | IFT, md/cm No Additive | IFT, md/cm With Taurine |
|---|---|---|
| 1.6/1.2/2.2 | unstable | 76 |
| 1.6/2.0/1.4 | 30.7 | 29 |
| 1.6/2.4/1.0 | 77 | unstable |
| 1.6/2.8/0.6 | 11.8 | unstable |
| 2.0/0.4/2.6 | 153 | unstable |
| 2.0/0.8/2.2 | 93.7 | 65.2 |
| 2.0/1.2/1.8 | 43.3 | 32.7 |
| 2.0/1.6/1.4 | 14.9 | 16.7 |
| 2.0/2.0/1.0 | 3.1 | 7.6 |
| 2.0/2.4/0.6 | 28.2 | 2.0 |
| 2.4/0.0/2.6 | 175 | unstable |
| 2.4/0.4/2.2 | 94 | unstable |
| 2.4/0.8/1.8 | 36.4 | 2.6 |
| 2.4/1.2/1.4 | oil hardened | 9.7 |
| 2.4/1.6/1.0 | 37.5 | 25.3 |
| 2.4/2.0/0.6 | unstable | 16.1 |
| 2.8/0.0/2.2 | 3.3 | 3.9 |
| 2.8/0.4/1.8 | oil hardened | 28.1 |
| 2.8/0.8/1.4 | unstable | 37.5 |
| 2.8/1.2/1.0 | unstable | 36.2 |

After eliminating solutions with an interfacial tension 50 md/cm, Table 1 indicates a 3 to 1 improvement (lower interfacial tension) with the solutions with taurine over the solutions without taurine. This improvement indicates significant improvement in oil recovery will likely be obtained with the addition of taurine to the surfactant solution used to enhance oil recovery.

Oil Recovery Tests

The base formulation or "optimum" combination (without taurine)—the combination showing the likelihood of greatest enhancement of oil recovery—(1.8% TRS18; 1.8% TRS40; and 1.4% LN60COS), and four combinations from Table 1, were selected for testing with and without 0.5% taurine in corefloods. The base surfactant formulation (without taurine) was determined by traditional methods to be the optimum surfactant combination for the reservoir in the Salem field from which the cores used in the experiment were taken. A field test of this combination is reported by Ware in "Salem Unit Micellar/Polymer Project," SPE 11985, *Proceedings of the 58th Annual SPE Technical Conference and Exhibition.* San Francisco, Calif., Oct. 5-8, 1983. Salem field brine or synthetic brine with the composition of the Salem field brine was also used in the experiment.

Those skilled in the art understand how to perform corefloods. A discussion of an exemplary technique may be found in U.S. Pat. Nos. 4,490,676 and 4,482,634 to Davis, Jr. et al., and in Ashrawi, "A Study of the Relationship Between Surfactant/Oil/Brine System Phase Behavior and Chemical Flood Recovery in Short Cores," SPE/DOE 12702, *Proceedings of the SPE/DOE IC Fourth Symposium on Enhanced Oil Recovery,* Tulsa, Okla., Apr. 15-18, 1984. For these oil recovery tests, interfacial tensions were measured by the sessile drop method, and oil saturations in the Salem cores were measured by microwave adsorption. Percent oil recovery with the surfactant solution was determined, and the results are shown in Table 2 below.

TABLE 2

COREFLOODS WITH SALEM BRINE

| Surfactant | mdyne/cm | $S_{orw}$ | $S_{orc}$ | $\Delta S_o$ | $E_R$, % |
|---|---|---|---|---|---|
| Base: 1.8% TRS18 1.8% TRS40 1.4% LN60COS No additive | 3.4 | 0.304 | 0.063 | 0.241 | 79 |
| 1.8% TRS18 1.8% TRS40 1.4% LN60COS +0.25% Taurine | — | 0.295 | 0.040 | 0.255 | 86 |
| 2.0% TRS18 2.0% TRS40 1.0% LN60COS +0.5% Taurine | 7.6 | 0.294 | 0.183 | 0.111 | 38 |
| 2.0% TRS18 2.4% TRS40 0.6% LN60COS +0.5% Taurine | 1.98 | 0.288 | 0.049 | 0.239 | 83 |
| 2.4% TRS18 0.8% TRS40 1.8% LN60COS +0.5% Taurine | 2.6 | 0.295 | 0.200 | 0.095 | 32 |
| 2.4% TRS18 0.4% TRS40 2.2% LN60COS +0.5% Taurine | — | 0.290 | 0.095 | 0.195 | 67 | mdyne/cm = interfacial tension
$S_{orw}$ = residual oil saturation after waterflooding the core
$S_{orc}$ = residual oil saturation after surfactant flooding the core
$\Delta S_o$ = change in oil saturation after surfactant flooding the core
$E_R$, % = percent waterflood residual oil recovered Addition of 0.25% by weight taurine improved the recovery of the base or optimum (for this reservoir) surfactant system from 79% to 86%. Addition of 0.5% taurine also resulted in good recovery (83%) with the surfactant system: 2.0% TRS8; 2.4% TRS40; 0.6% LN60COS. Without taurine, recovery with this surfactant system was expected to be very low (less than 30%).

Salinity Scans With Corefloods

Since taurine is strongly hydrophilic, salinity scans with corefloods were conducted to determine the effect of taurine on the phase behavior of the surfactant system to which it is added. Three different concentrations of taurine—0.25%, 0.5% and 0.75% by weight—were tested with the base or optimum surfactant blend cited above for the Salem reservoir, or more precisely the Benoist reservoir in the Salem field.

Coreflood salinity scans were conducted over the range 0.6 to 1.4 SIB units. An SIB unit is defined as a baseline salinity unit, the baseline salinity of 1 SIB being the salinity of the brine injected in a field test using surfactant without taurines in the Salem reservoir. Such brine was previously determined by traditional coreflood methods to be preferred for conducting a surfactant flood of the Salem reservoir with the base surfactant system (without taurine), and hence this brine provided a known point or baseline for comparison with salinity scans of the surfactant system with addition of taurine. One SIB unit indicates a salinity of 70,600 ppm total dissolved solids (TDS) in water. The brines used in the scans were sodium chloride solutions in water with 70,600 ppm TDS, equivalent to one SIB unit and were diluted with water or concentrated by adding more salt.

Phase behavior studies conducted with 1:1 Salem crude oil and brine indicated that the taurine shifted the optimal salinity upwards while still maintaining a broad 3-phase region. The brine was Salem Field brine which was either diluted with water or concentrated by evaporation. These results indicated that taurine increased the overall salt tolerance of the surfactant system.

Those skilled in the art understand how to conduct salinity scans and phase behaviour studies. A discussion of the effect of salinity on surfactant behavior is provided in Salager et al, "Optimum Formulation of Surfactant/Water/Oil Systems for Minimum Interfacial Tension of phase Behavior," *Society of Petroleum Engineers Journal*, pp. 107-115 (April 1979).

Specifically, corefloods with short cores (less than four inches in length) were conducted for the base or optimum (for the Salem reservoir) surfactant system—1.8% TRS18; 1.8% TRS40; 1.4% LN60COS—with 0.25%, 0.5% or 0.75% taurine added, using Salem crude oil in a Berea sandstone matrix. brine salinity was kept constant during each coreflood but was different for each coreflood. The results of the corefloods are shown in Table 3.

TABLE 3

COREFLOODS WITH DIFFERENT SALINITIES

| Surfactant | $S_{oi}$ | $S_{orw}$ | $S_{orc}$ | $\Delta S_o$ | $E_R$, % |
|---|---|---|---|---|---|
| 5% Surf + 0.25% Taurine in 0.6 SIB | 0.720 | 0.321 | 0.176 | 0.145 | 54.8 |
| 5% Surf + 0.25% Taurine in 0.8 SIB | 0.700 | 0.300 | 0.055 | 0.245 | 81.7 |
| 5% Surf + 0.25% Taurine in 0.9 SIB | 0.690 | 0.299 | 0.035 | 0.264 | 88.3 |
| 5% Surf + 0.25% Taurine in 1 SIB | 0.695 | 0.297 | 0.074 | 0.223 | 75.1 |
| 5% Surf + 0.25% Taurine in 1.2 SIB | 0.691 | 0.295 | 0.120 | 0.175 | 59.3 |
| 5% Surf + 0.25% Taurine in 1.4 SIB | 0.695 | 0.340 | 0.200 | 0.140 | 41.9 |
| 5% Surf + 0.5% Taurine in 0.7 SIB | 0.760 | 0.355 | 0.105 | 0.250 | 70.4 |
| 5% Surf + 0.5% Taurine in .8 SIB | 0.719 | 0.234 | 0.022 | 0.212 | 90.6 |
| 5% Surf + 0.5% Taurine in 0.9 SIB | 0.718 | 0.293 | 0.064 | 0.229 | 78.2 |
| 5% Surf + 0.5% Taurine in 1 SIB | 0.675 | 0.290 | 0.111 | 0.179 | 61.7 |
| 5% Surf + 0.5% Taurine in 1.2 SIB | 0.700 | 0.300 | 0.175 | 0.125 | 41.7 |
| 5% Surf + 0.75% Taurine in 0.7 SIB | 0.760 | 0.370 | 0.105 | 0.265 | 71.6 |
| 5% Surf + 0.75% Taurine in .8 SIB | 0.698 | 0.302 | 0.043 | 0.259 | 85.8 |
| 5% Surf + 0.75% Taurine in 0.9 SIB | 0.704 | 0.286 | 0.167 | 0.219 | 76.6 |
| 5% Surf + 0.75% Taurine in 1 SIB | 0.657 | 0.298 | 0.134 | 0.164 | 55 |
| 5% Surf + 0.75% Taurine in 1.2 SIB | 0.674 | 0.303 | 0.183 | 0.120 | 39.6 |

$S_{oi}$ = original oil saturation or oil in place in the core prior to waterflooding the core
$S_{orw}$ = residual oil saturation after waterflooding the core
$S_{orc}$ = residual oil saturation after surfactant flooding the core
$\Delta S_o$ = change in oil saturation after surfactant flooding the core
$E_R$, % = percent of waterflood residual oil recovered with the surfactant flood The corefloods showed an improvement of over 10% in increased oil recovery with the surfactant system with taurine compared with the surfactant system without taurine.

The principle of the invention and the best mode contemplated for applying that principle have been described. It is to be understood that the foregoing is illustrative only and that other means and techniques can be employed without departing from the true scope of the invention defined by the following claims.

We claim:

1. In a method for recovering petroleum from a subterranean, petroleum-bearing formation penetrated by at least one injection well and at least one production well, said recovery method being of the type wherein an aqueous fluid comprising anionic surfactant is injected into the formation via the injection well, and oil displaced by the injected fluid is recovered from the formation via the production well, wherein the improvement comprises adding a taurine to said aqueous fluid comprising an anionic surfactant, said taurine having the following formula:

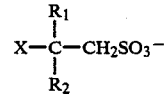

wherein $R_1$ is selected from the group comprising hydrogen, a phenyl group, and alkyl groups having from about 1-4 carbon atoms, $R_2$ is selected from the group comprising hydrogen, a phenyl group, and alkyl groups having from about 1-4 carbon atoms, and X is selected from the group comprising $NH_2$ and $NH_3^+$.

2. The method of claim 1 wherein said taurine is 2-aminoethanesulfonic acid.

3. The method of claim 1 wherein said taurine is dimethyl taurine.

4. A method for increasing the salt tolerance of an anionic surfactant for use in enhanced oil recovery operations, said method comprising blending an effective amount of a taurine with said anionic surfactant prior to said use, said taurine having the formula

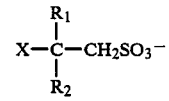

wherein $R_1$ is selected from the group comprising hydrogen, a phenyl group, and alkyl groups having from about 1-4 carbon atoms, $R_2$ is selected from the group comprising hydrogen, a phenyl group, and alkyl groups having from about 1-4 carbon atoms, and X is selected from the group comprising $NH_2$ and $NH_3^+$.

5. A method for increasing the divalent ion tolerance of an anionic surfactant for use in enhanced oil recovery operations, said method comprising blending an effective amount of a taurine with said anionic surfactant prior to said use, said taurine having the formula

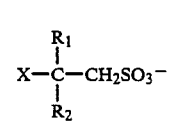

wherein $R_1$ is selected from the group comprising hydrogen, a phenyl group, and alkyl groups having from about 1-4 carbon atoms, $R_2$ is selected from the group comprising hydrogen, a phenyl group, and alkyl groups having from about 1-4 carbon atoms, and X is selected from the group comprising $NH_2$ and $NH_3^+$.

6. The method of claim 1, wherein said method comprises adding a taurine to said anionic surfactant in an amount greater than about 0.05% by weight but less than the amount of anionic surfactant.

7. A method for recovering petroleum from a subterranean petroleum-bearing formation, penetrated by at least one injection well and at least one production well, said method comprising:

injecting into said formation via said injection well an aqueous fluid comprising an effective amount of a taurine blended with an amount of an anionic surfactant system greater than the amount of taurine; said taurine having the formula $$X-\underset{R_2}{\overset{R_1}{\underset{|}{\overset{|}{C}}}}-CH_2SO_3^-$$

wherein $R_1$ is selected from the group comprising hydrogen, a phenyl group, and alkyl groups having from about 1–4 carbon atoms, $R_2$ is selected from the group comprising hydrogen, a phenyl group, and alkyl groups having from about 1–4 carbon atoms, and X is selected from the group comprising $NH_2$ and $NH_3^+$, driving said aqueous fluid through said formation toward said production well; and recovering displaced oil from said formation via said production well.

8. The method of claim 1 wherein the concentration in said aqueous fluid of said taurine is less than about 2% by weight and the concentration of said anionic surfactant system is about 5% by weight or less.

9. The method of claim 1 wherein said drive fluid comprises a mobility control fluid.

10. In a method for recovering petroleum from a subterranean, petroleum-bearing formation penetrated by at least one injection well and at least one production well, said recovery method being of the type wherein an aqueous fluid comprising anionic surfactant is injected into the formation via the injection well, and oil displaced by the injected fluid is recovered from the formation via the production well, wherein the improvement comprises adding a taurine to said aqueous fluid comprising an anionic surfactant, said taurine having the following formula:

$$X-\underset{R_2}{\overset{R_1}{\underset{|}{\overset{|}{C}}}}-CH_2COO^-$$

wherein $R_1$ is selected from the group comprising hydrogen, a phenyl group, and alkyl groups having from about 1–4 carbon atoms, $R_2$ is selected from the group comprising hydrogen, a phenyl group, and alkyl groups having from about 1–4 carbon atoms, and X is selected from the group comprising $NH_2$ and $NH_3^+$.

11. In a method for recovering petroleum from a subterranean, petroleum-bearing formation penetrated by at least one injection well and at least one production well, said recovery method being of the type wherein an aqueous fluid comprising anionic surfactant is injected into the formation via the injection well, and oil displaced by the injected fluid is recovered from the formation via the production well, wherein the improvement comprises adding a taurine to said aqueous fluid comprising an anionic surfactant, said taurine having the following formula:

$$X-\underset{R_2}{\overset{R_1}{\underset{|}{\overset{|}{C}}}}-CH_2SO_4^-$$

wherein $R_1$ is selected from the group comprising hydrogen, a phenyl group, and alkyl groups having from about 1–4 carbon atoms, $R_2$ is selected from the group comprising hydrogen, a phenyl group, and alkyl groups having from about 1–4 carbon atoms, and X is selected from the group comprising $NH_2$ and $NH_3^+$.

* * * * *